(12) United States Patent
Martin et al.

(10) Patent No.: US 7,656,573 B2
(45) Date of Patent: Feb. 2, 2010

(54) METHOD AND APPARATUS FOR CONTROLLING A GAP BETWEEN CONDUCTORS IN AN ELECTRO-MECHANICAL DEVICE

(75) Inventors: Eric T. Martin, Corvallis, OR (US);
Mark Hunter, Portland, OR (US);
Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1050 days.

(21) Appl. No.: 10/782,593

(22) Filed: Feb. 18, 2004

(65) Prior Publication Data

US 2005/0180087 A1 Aug. 18, 2005

(51) Int. Cl.
*G02B 26/00* (2006.01)
*G02B 26/08* (2006.01)
*G02F 1/29* (2006.01)

(52) U.S. Cl. .................... 359/290; 359/298

(58) Field of Classification Search .......... 359/290, 359/291, 292, 295, 298
See application file for complete search history.

(56) References Cited

U.S. PATENT DOCUMENTS

| 6,662,029 B2* | 12/2003 | Eden et al. ............... 505/210 |
| 6,774,719 B1* | 8/2004 | Wessel et al. ............. 330/136 |
| 2002/0106144 A1 | 8/2002 | Garverick et al. |
| 2004/0141224 A1 | 7/2004 | Huibers |
| 2004/0218341 A1* | 11/2004 | Martin et al. ............. 361/278 |
| 2004/0240138 A1 | 12/2004 | Martin et al. |

* cited by examiner

*Primary Examiner*—Ricky L Mack
*Assistant Examiner*—Brandi N Thomas

(57) ABSTRACT

A method and apparatus for controlling a gap between conductors in an electro-mechanical device by controlled displacement of a displaceable conductor within the electro-mechanical device is provided. The apparatus includes a current controller configured to generate a controlled current output for the electro-mechanical device in response to a control signal, the current controller selectively routing a voltage to an array element including control circuitry and the electro-mechanical device.

8 Claims, 10 Drawing Sheets

METHOD AND APPARATUS FOR CONTROLLING A GAP BETWEEN CONDUCTORS IN AN ELECTRO-MECHANICAL DEVICE

BACKGROUND OF THE INVENTION

Mircro-electromechanical systems (MEMS) exist which combine mechanical devices, such as mirrors and actuators, with electronic control circuitry for controlling the mechanical devices. One such device is referred to as a diffractive light device (DLD), and includes a variable capacitor composed of a fixed reflective ground plate and a semi-transparent, electrostatically movable second plate. The variable gap between the plates produces a desired interference or diffraction of light passing therein, which can be used for spatial light modulation in high resolution displays and for wavelength management in optical communication systems.

Conventional control systems for controlling the variable gap in DLDs and other MEMs devices, however, have been shown to have a non-linear relationship between the voltages generated to control the gap size versus plate displacement for achieving a desired gap size. This non-linear relationship limits precise control of plate movement to less than one third of the total gap distance before the plate "snaps down" to mechanical stops. This "snap down" phenomenon is also known as a pull-in characteristic in the art.

Techniques for increasing the controllable distance often require large control circuit footprints due in part to the presence of switching elements and the like, which correspondingly increases the footprint of the controller and prevents implementation in applications requiring relatively small control circuit sizes (e.g., not greater than 20 $u^2$ per MEMs device). Other techniques for increasing the controllable distance suffer from parasitic drops in control lines (particularly in arrayed DLD applications), which causes a variation in power to DLDs across the array.

DETAILED DESCRIPTION OF THE EMBODIMENTS

Figure 10:
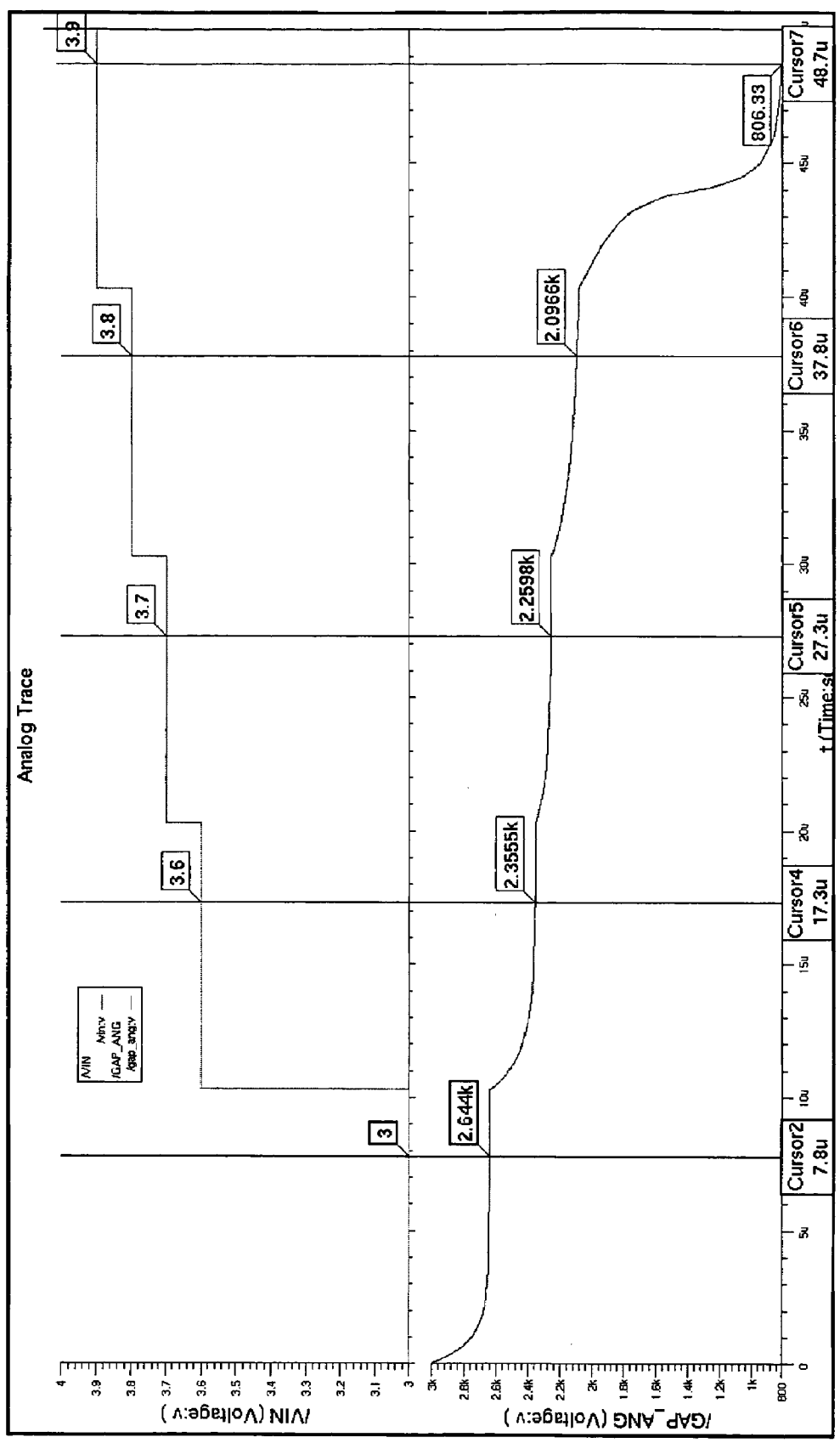
FIG. 10 is a graph demonstrating gap as a function of ideal voltage control.

FIG. 10 is a graph of voltage control which illustrates gap as a function of ideal voltage control for a MEMS device. The voltage is incremented in small steps, and the gap is allowed to settle to an equilibrium state for each increment. Even with ideal voltage control, gap range "snaps down" after ⅓ gap travel (initial gap in this simulation was 3000 Ang, and snap down occurs at 2000 Ang). This is known as the pull-in effect and the ⅓ limit is a widely understood phenomenon in published literature.

Figure 3:
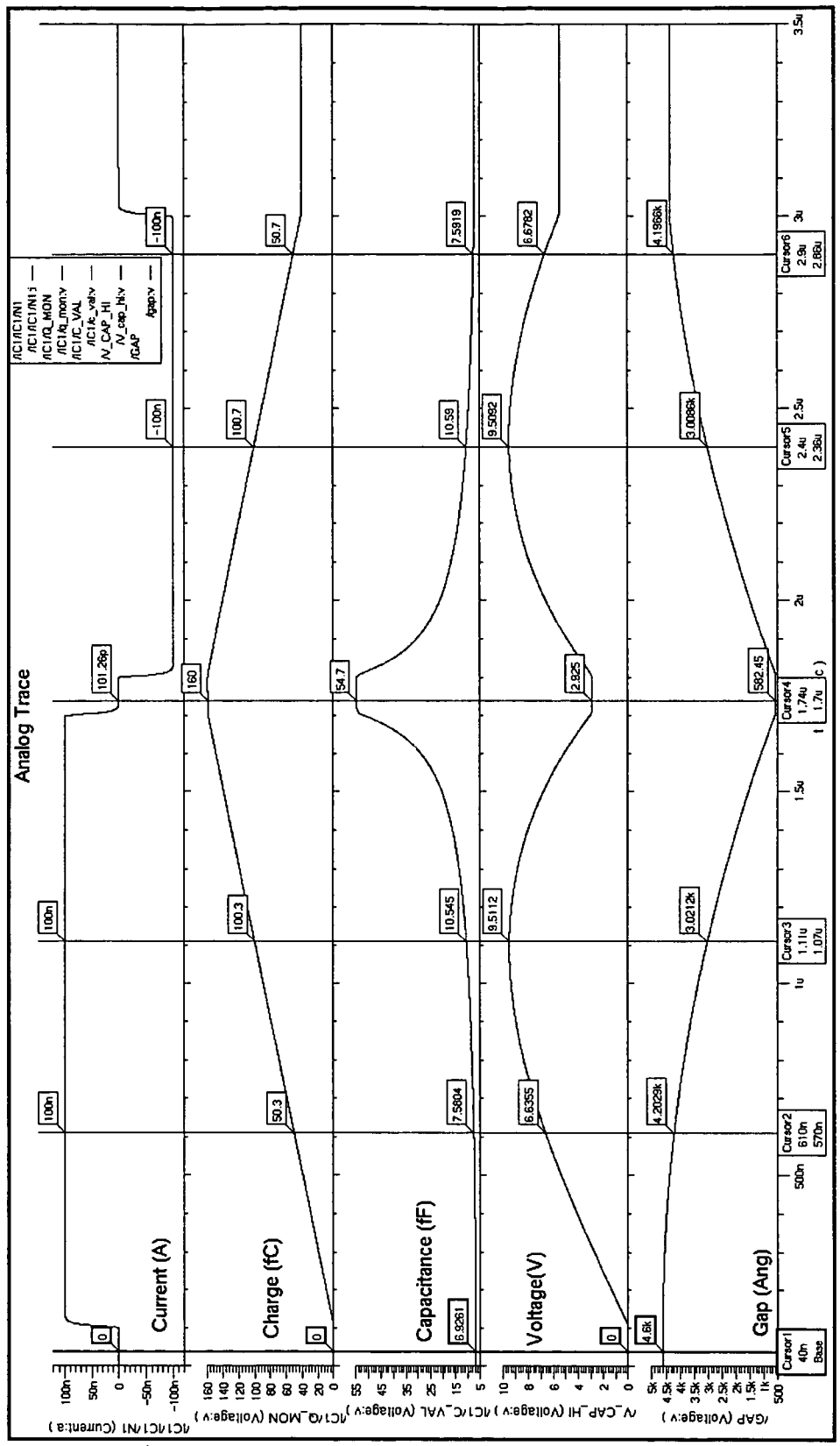
FIG. 3 is a graph demonstrating gap as a function of ideal charge control.

FIG. 3 demonstrates gap as a function of ideal charge control for a MEMS device. Ideal charge control is achieved by coupling an ideal (fully voltage compliant) current source to the MEMS actuator and modulating the on time of the ideal current source (Q=i*dt). Gap is essentially a linear function of charge, and full gap control range is shown.

Figure 9:
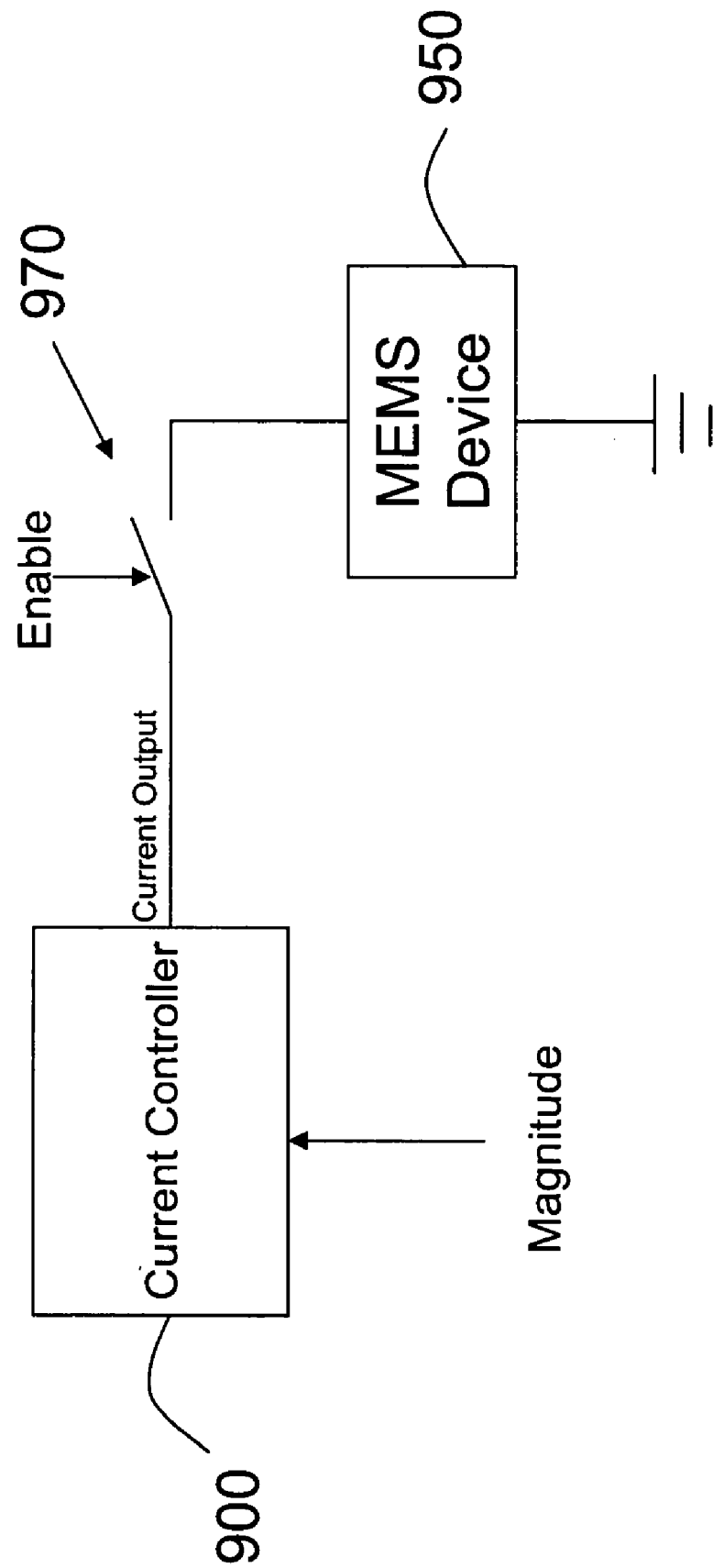
FIG. 9 is a schematic diagram of a control system according to an embodiment of the present invention.

Referring now to FIG. 9, a control system for controlling a gap between conductors in a MEMs device 150 according to an embodiment of the present invention is shown schematically. The control system includes a current controller 900 configured to generate a controlled current output for MEMs device 950. The current controller includes a magnitude input which controls magnitude of output current. A switch element 970 is disposed to couple or decouple the current output of the current controller 900 to the MEMS device 950 accordance with an enable signal on line EN. Thus, charge "written" to MEMS device=magnitude of current*Enable on-time.

Figure 1:
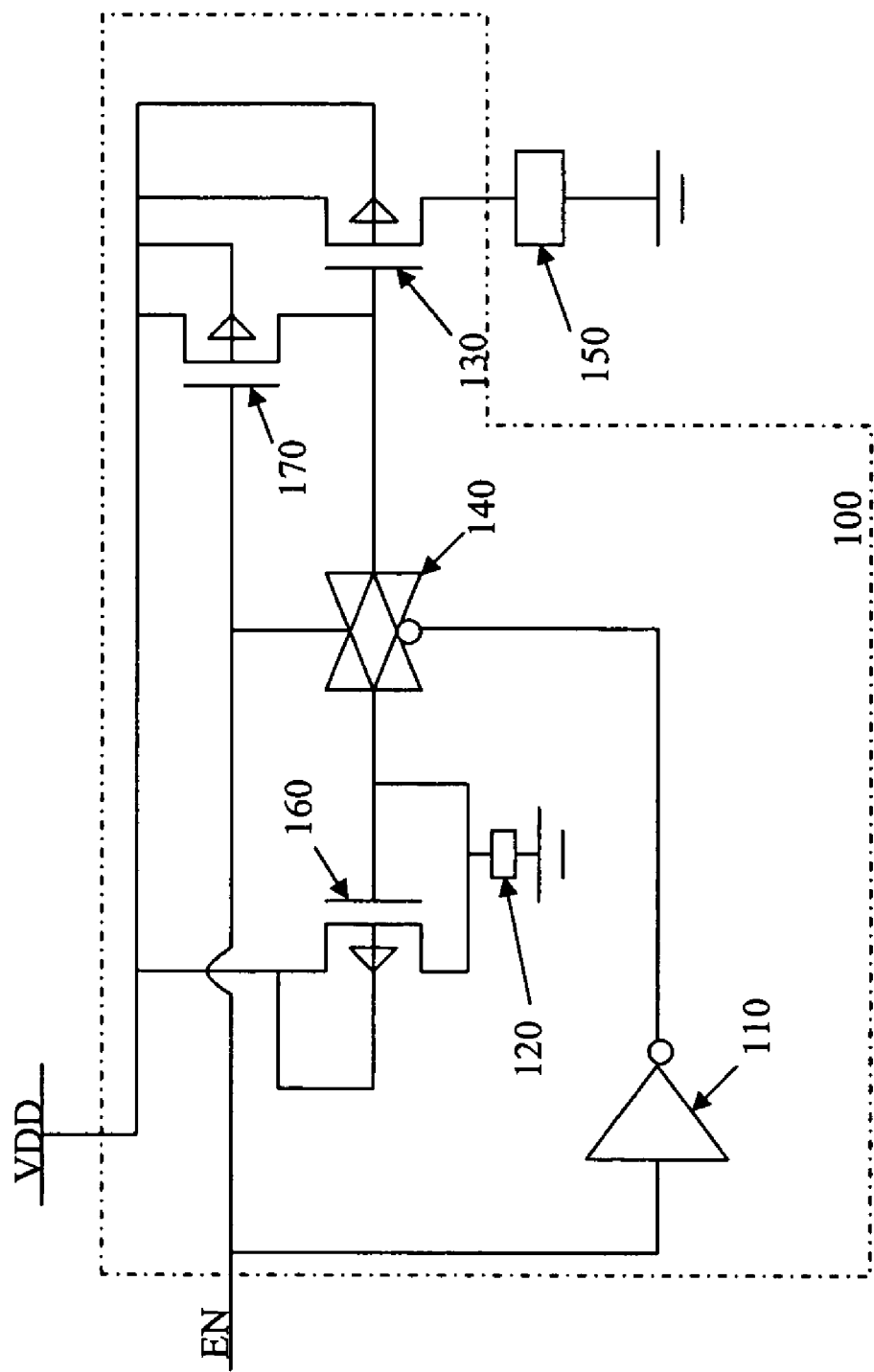
FIG. 1 is a circuit diagram of a control system according to an embodiment of the present invention.
Figure 2:
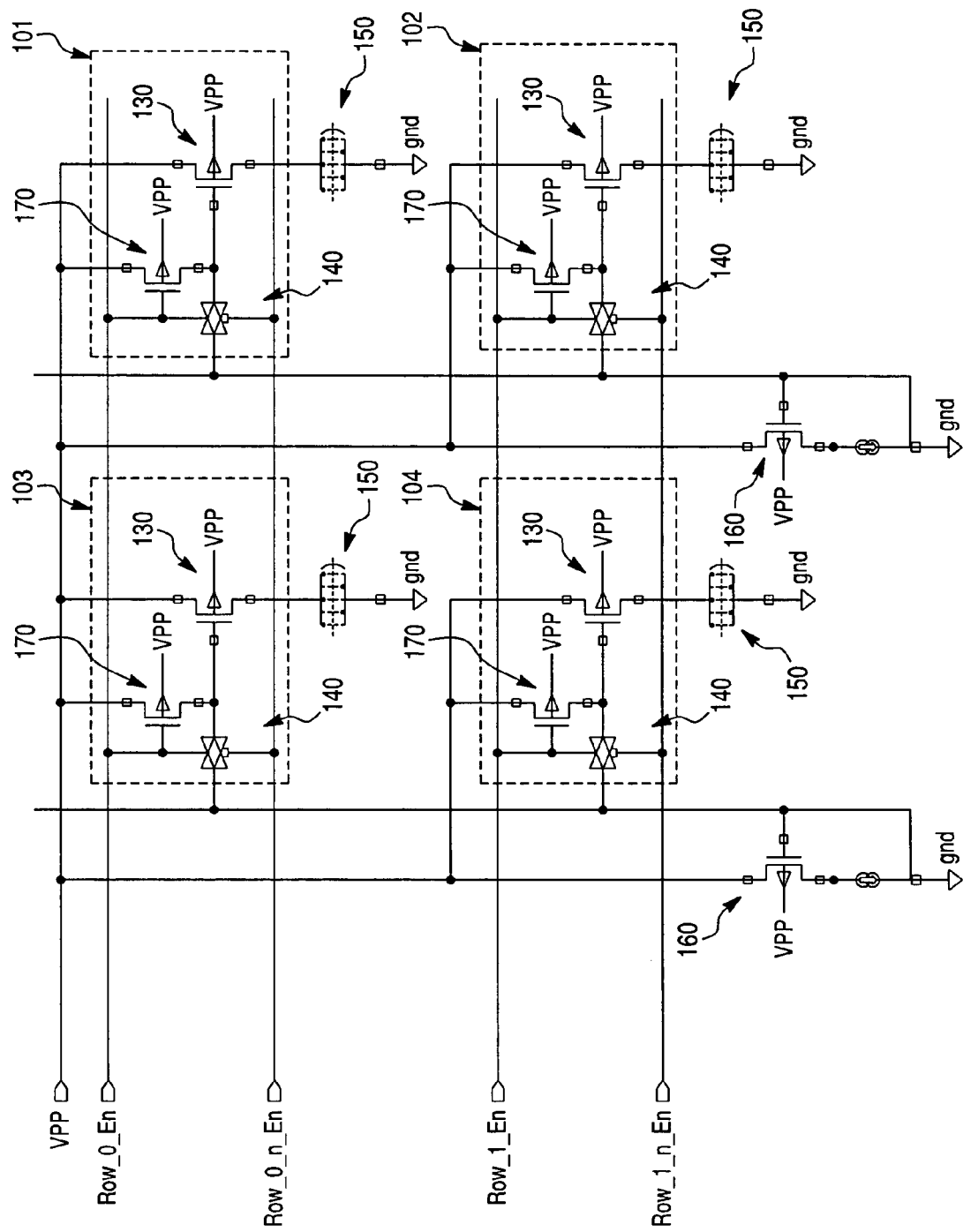
FIG. 2 is an exemplary 2×2 array using the control system of FIG. 1.

Referring now to FIG. 1, a further embodiment of the present invention is disclosed for controlling a gap between conductors in a MEMs device 150, which uses realistic and available components. The control system includes a current controller 100 configured to generate a controlled current output for MEMs device 150. While only one current controller 100 for one MEMs device 150 is shown in FIG. 1, it should be appreciated that the current controller 100 and MEMs device 150 may be incorporated into an array (see controllers 101, 102, 103 and 104 in FIG. 2) to control a gap between conductors in a plurality of MEMs devices 150. By way of example a typical SVGA display/projector would have an 800×600 array of MEMs devices 150. In a large array of MEMs devices 150 the per-column column data may be set up first. As will be described in greater detail below, that column data controls the magnitude of the current that the MEMS device 150 in that column sinks. Once that column data is set up, one row is enabled for a particular pulse width. After that row is disabled, the column data for the next row is set up, then the next row is enabled, etc. So once a row has been "written", capacitive elements of the system hold the charge on the MEMS device 150 while other rows are written, and that first row can be written again. Other array configurations are also plausible, as would be readily apparent to one of ordinary skill in the art after reading this disclosure.

The current controller 100 includes an input for receiving a control signal (e.g., enabling control signal (EN)), a current mirror having MOS devices 130 and 160, and a pull-up MOS device 170 coupled to the current mirror and configured to disable the output of the current mirror (e.g., raise a gate voltage of MOS 130) when the transmission gate 140 disables the current mirror. An inverter 110 may or may not be provided, depending on the particular type of transmission gate 140 used or if the control signal(s) are generated on the periphery of the array and routed to the array. Thus, the controlled current outputs are variable voltage compliant. Further, it should be appreciated that, while transmission gate 140 is shown as one type of current mirror enabler, other components may be used, such as a pmos or nmos type device. With the aforementioned structure, however, the current controller 100 may have a footprint not greater than 20 u² per MEMs device 150. Note that enabler device 140 in this embodiment has the purpose of coupling or decoupling the gates of 160 and 130 when the current mirror output (drain of 130) is "off". When the current mirror is off, the gate of device 130 is prevented from floating (to stop current from flowing out of the drain of 130), so MOS device 170 is used to fully turn off 130. Note that devices 130 and 170 are included because, in a large array, there would be one of devices 160 & 120 per column, and one of devices 140, 170, and 130 in each pixel in each column. Since a charge is "written" a row at a time, it is desired to have only one device 130 in a particular column "on" at any given time. Consequently, it is desired that the gate of device 160 and the gate of only ONE device 130 in the column be coupled together at any given time.

The current mirror is configured to mirror a reference current onto a controlled current output for MEMs device 150. In this regard, the reference current may be generated by an external current source coupled to the current controller 100 via coupling 120, or may be generated by a current source within the current controller 100 provided at coupling 120. By either configuration, the reference current is precisely controlled to achieve a corresponding gap control in MEMs device 150 when the current mirror is enabled by transmission gate 140. In this manner, a gap size within the MEMs device 150 can be adjusted for a particular MEMs device 150 in an array of MEMs devices.

Figure 4:
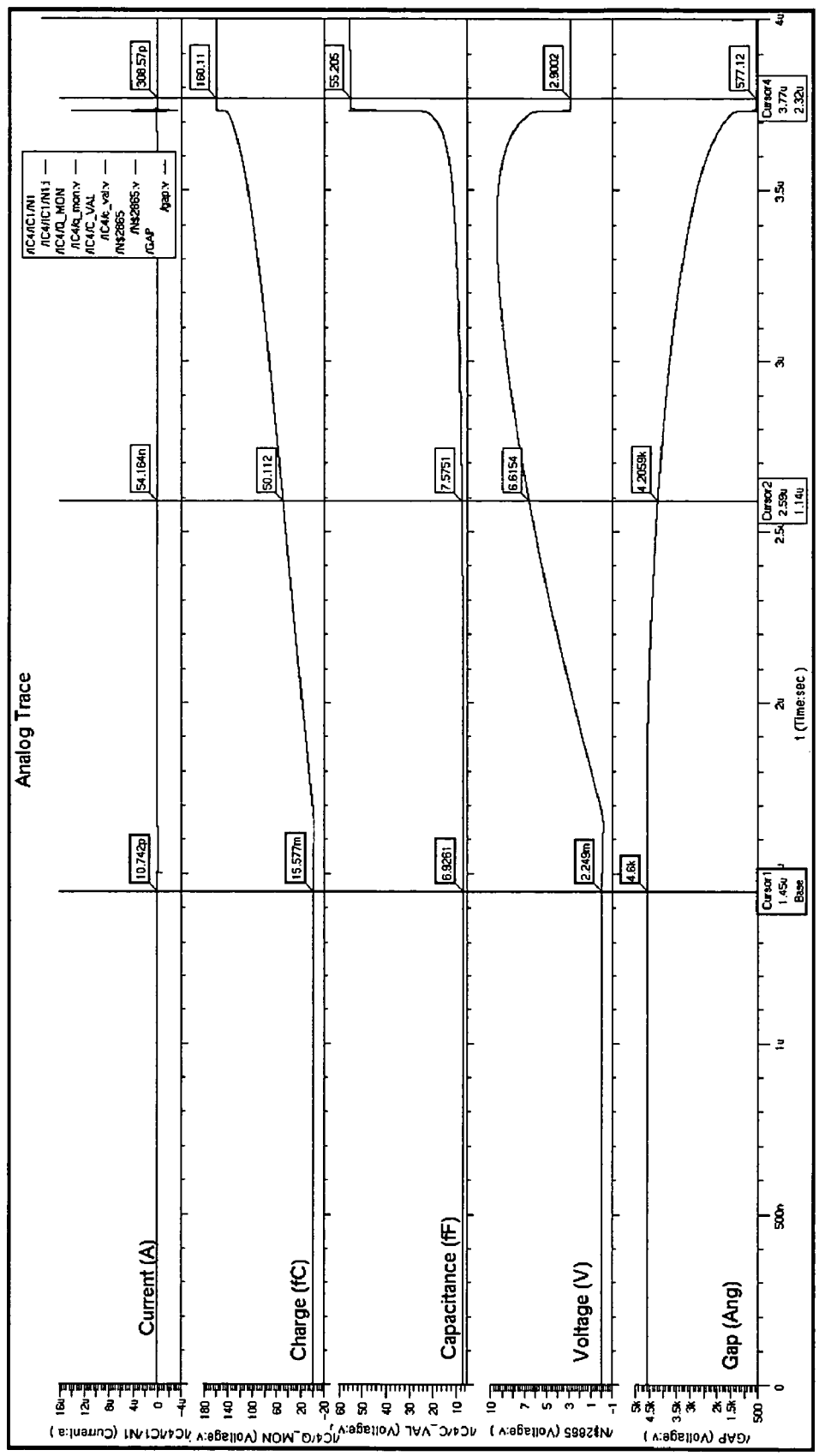
FIG. 4 is a theoretical timing diagram for the control system of FIG. 1, assuming typical characteristic behaviors of implemented components.

FIGS. 3 and 4 show exemplary timing diagrams for a control system. FIG. 3 demonstrates gap as a function of ideal charge control. Idea charge control is achieved by coupling an ideal (fully voltage compliant) current source to the MEMS actuator and modulating the on time of the ideal current source (Q=i*dt). Gap is essentially a linear function of charge, and full gap control range is shown. Current (A) refers to the current mirrored onto a controlled current output by the current mirror. Charge (fC) refers to the charge between the movable plate and the fixed plate within MEMs device 150 (the amount of charge being put on a MEMs device 150 is a function of current magnitude and pulsewidth by Q=I*dt). Capacitance (fF) refers to the capacitance between the movable plate and the fixed plate within MEMs device 150. Voltage (V) refers to the voltage difference between the movable plate and the fixed plate within MEMs device 150. Gap (Ang) refers to the distance between the movable plate and the fixed plate within MEMs device 150.

FIG. 4 illustrates one embodiment (using the simple MOS current mirror) of charge control using realistic models of MOS devices with primary and secondary parasitic effects included in the MOS models. The method of FIG. 3 (time-modulated current pulse) is used to put a controlled amount of charge on the MEMS device. While parasitic effects of the MOS devices do not allow, for this embodiment, full gap control range, gap control remains stable well beyond the ⅓ voltage control limit to at least 45% of the gap. An embodiment for implementing FIG. 4 is shown in FIG. 1. An additional benefit of the FIG. 1 design (besides the extended gap control range) is that it may be easily incorporated into a large addressable array (130, 140, and 170 would be replicated at each pixel, while 110, 120, and 160 would be replicated on a pre-row or per-column basis) with a small per-pixel footprint.

Figure 5:
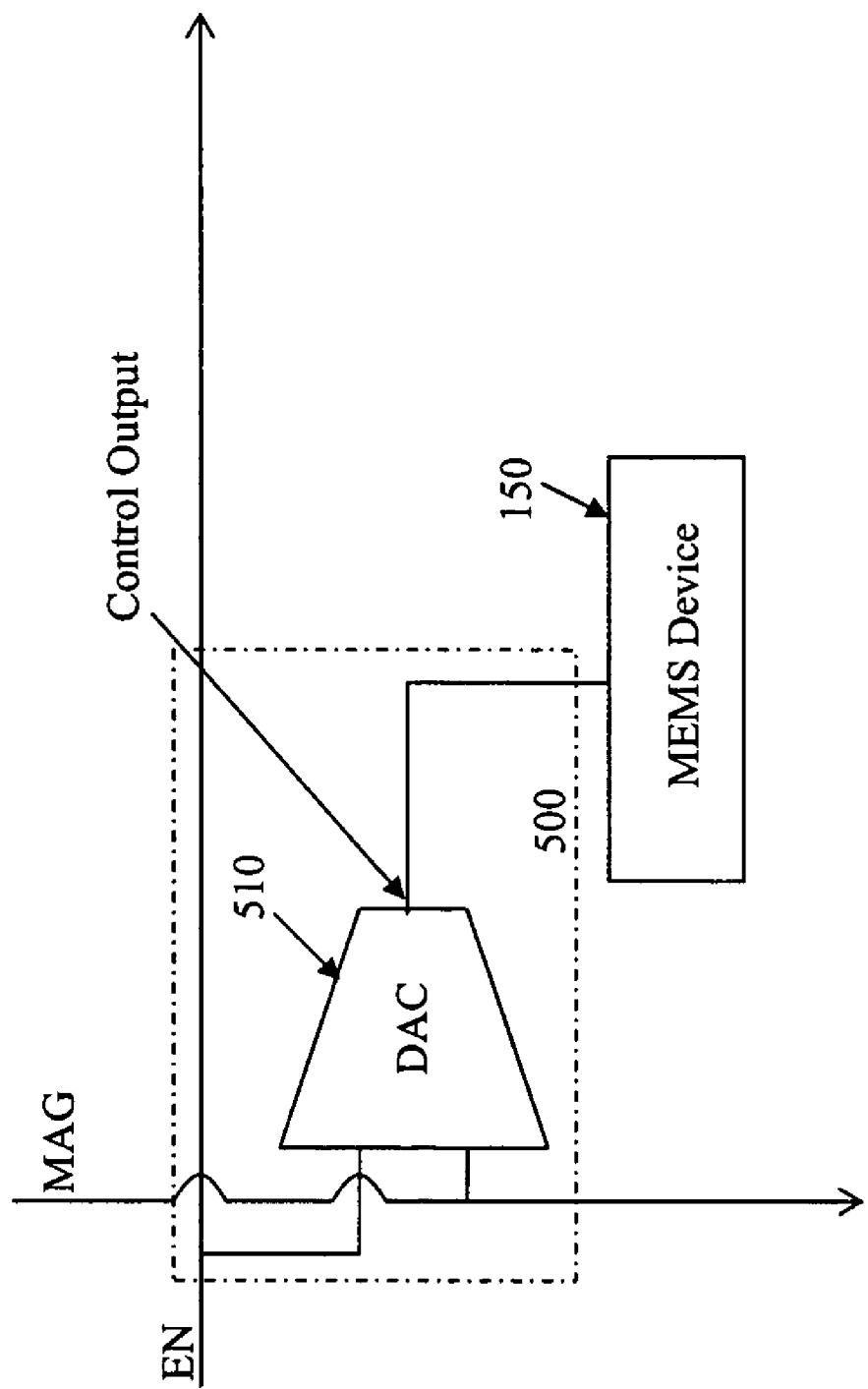
FIG. 5 is a circuit diagram of a control system according to yet another embodiment of the present invention.

A control system for controlling a gap between conductors in a MEMs device 150 according to yet another embodiment of the present invention is shown in the circuit diagram of FIG. 5. The control system of this embodiment includes a controller 500 configured to generate a control signal to selectively move the electrostatically movable plate in a MEMs device 150, and a current digital-to-analog-converter (DAC) 510 per MEMs device 150 configured to generate a controlled current output to move the electrostatically movable plate in a MEMs device 150 coupled thereto. More specifically, the DAC 510 converts a magnitude value (MAG) to an analog output current, the current magnitude being adjusted based on the particular amount of gap desired. Additionally, the pulsewidth of the EN signal can be adjusted based on the particular amount of gap desired.

Figure 6:
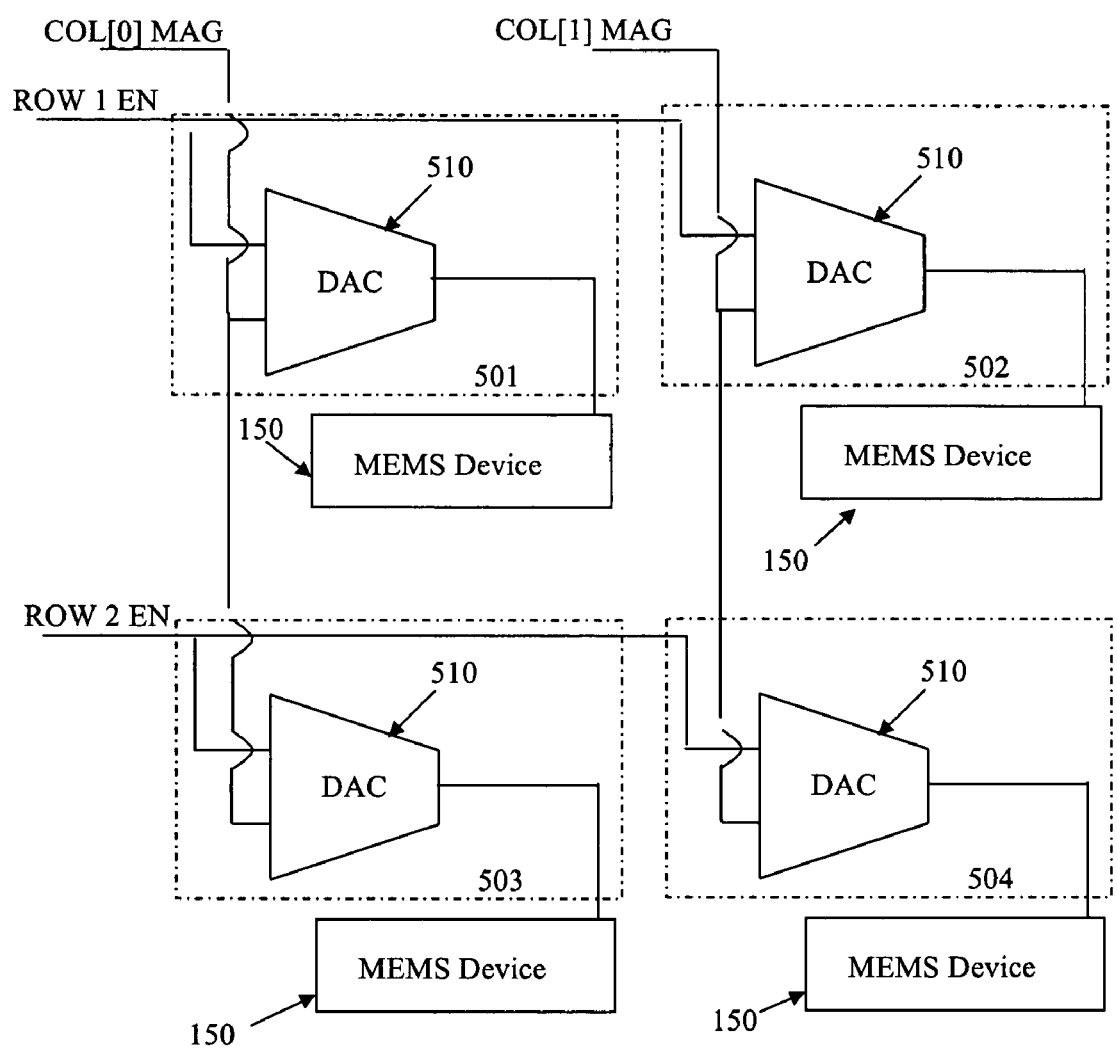
FIG. 6 is an exemplary 2×2 array using the control system of FIG. 5.

As with preceding embodiment(s) of the present invention, the control system of the present embodiment may be used to control a plurality of MEMs devices. By way of example, see the plurality of controllers 501, 502, 503, and 504 in FIG. 6, depicted in a 2×2 array. Any number of MEMs devices 150 could thus be controlled in this manner, by simply providing a DAC 510 per MEMs device 150 with appropriate control lines running thereto.

This embodiment of the present invention also capable of a greater amount of precise gap control than in conventional voltage control. Additionally, this embodiment can be easily implemented with existing componentry by properly arranging a plurality of DACs.

Figure 7:
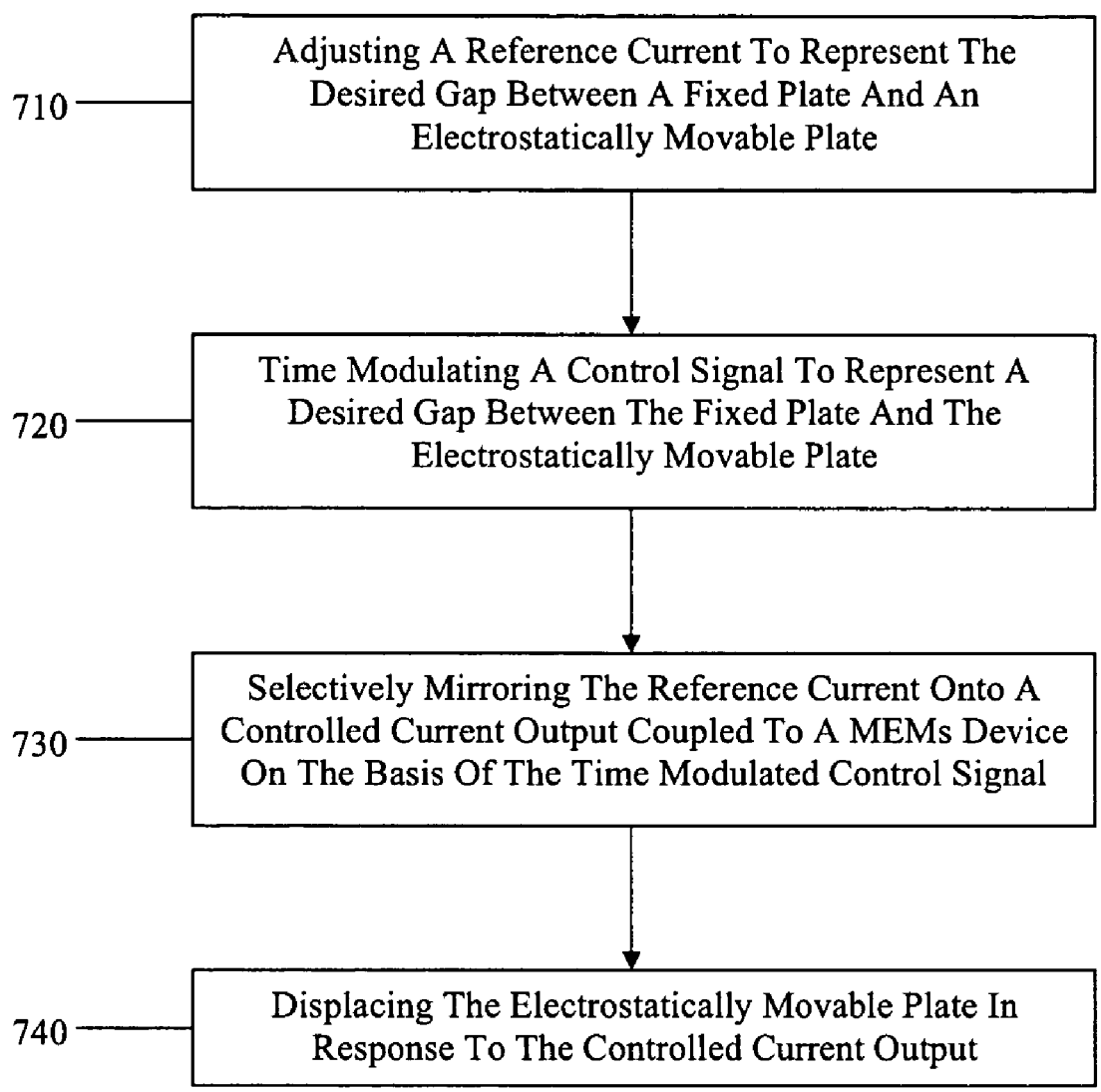
FIG. 7 depicts a method of controlling a gap between at least one fixed plate and an electrostatically movable plate in a MEMs device according to an embodiment of the present invention.

A method of controlling a gap between at least one fixed plate and an electrostatically movable plate in a MEMs device according to another embodiment of the present invention is shown in the flow chart of FIG. 7. In step 710, if desired, a reference current can be adjusted to represent the desired gap between the fixed plate and the electrostatically movable plate. In step 720 a control signal is then time modulated to represent a desired gap between the electrostatically movable plate and the fixed plate. The reference current is then selectively mirrored in step 730 onto a controlled current output coupled to a MEMs device on the basis of the time modulated control signal. This controlled current output then results in displacement of the electrostatically movable plate in step 740. In this manner, the desired gap size in the MEMs device can be achieved. As with other embodiments, this method may be replicated for use with a plurality of MEMs devices, such as in an array of MEMs devices.

Figure 8:
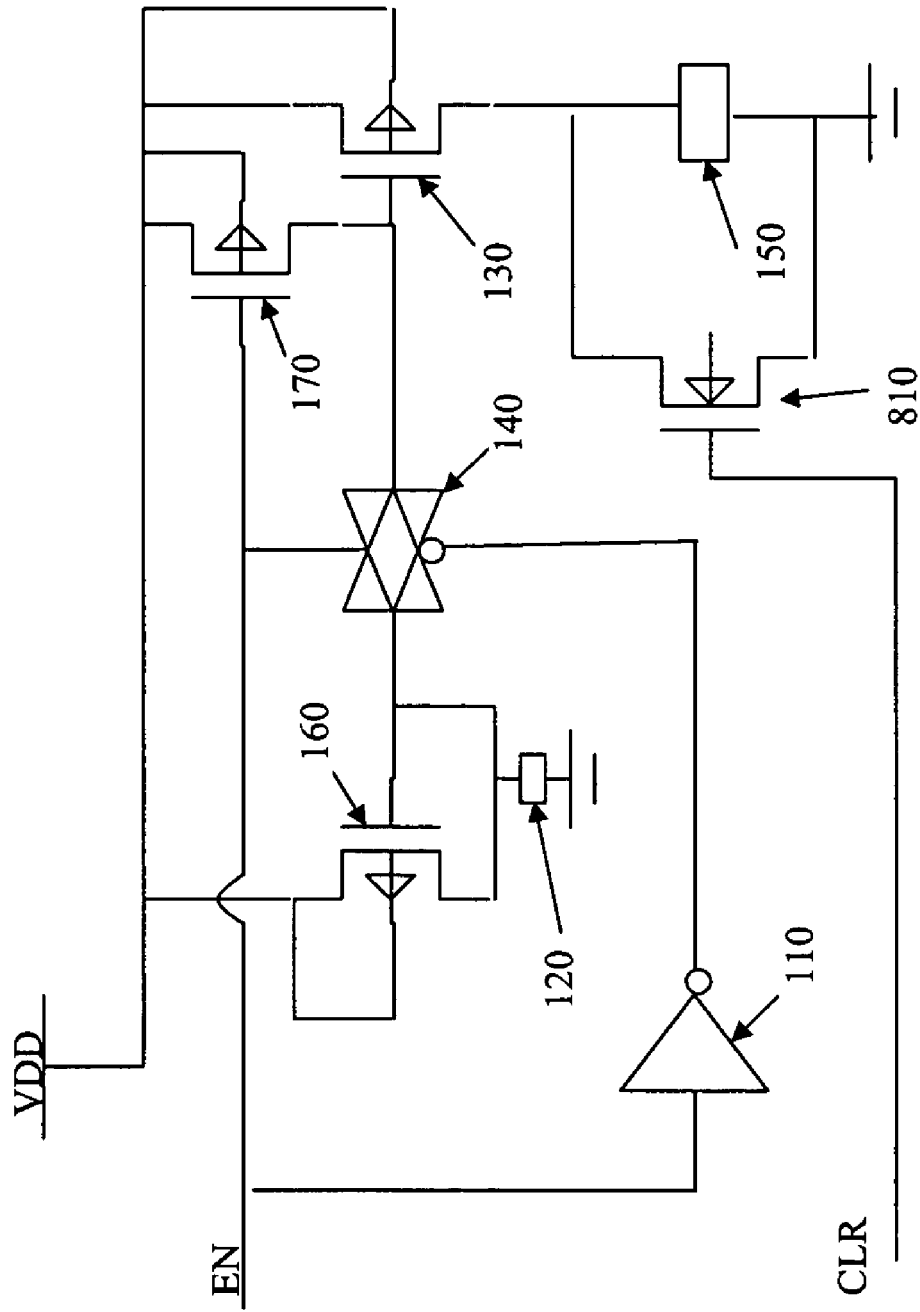
FIG. 8 depicts circuit diagram of a control system according to yet another embodiment of the present invention.

A control system for controlling a gap between conductors in a MEMs device 150 according to an embodiment of the present invention is shown in the circuit diagram of FIG. 8. As with previously described embodiments, the present embodiment sources current onto MEMs device 150 to control the gap size between plates therein. To further improve current control, however, the present embodiment sets the charge on the MEMs device 150 to a known state (such as about zero) before the charging occurs. Thus, according to this embodiment, an NMOS 810 is used to couple MEMs device 150 to ground. Using the NMOS 810 to clear MEMs device 150, the MEMs device 150 can be actuated by clearing substantially all of the charge off the MEMs device 150, setting up a current magnitude signal in a current controller as previously described, and enabling current output of the current controller for a known period of time. Other embodiments of the present invention, such as the DAC technique, may also use an NMOS 810 to clear MEMs device 150 in a like manner, thereby further improving the gap control.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of controlling a gap between at least one fixed plate and an electrostatically movable plate in a MEMs device, comprising:
    time modulating a control signal to a controlled current output that is variable voltage compliant to represent a desired gap between the fixed plate and the electrostatically movable plate;
    selectively routing a charge which is a function of the controlled current output and the modulated time to array elements each including control circuitry and one of a plurality of electro-mechanical devices; and
    displacing the electrostatically movable plate in response to the controlled current output.

2. The method as defined in claim 1, wherein selectively routing a charge comprises selectively mirroring a reference current onto the controlled current output coupled to the MEMs device on the basis of the time modulated control signal.

3. The method of claim 2, wherein selectively mirroring the reference current selectively mirrors the reference current onto a plurality of controlled current outputs, each of the plurality of controlled current outputs being coupled to one of a plurality of MEMs devices, and
    wherein displacing the electrostatically movable plate displaces an electrostatically movable plate in each of the plurality of MEMs devices in response to a corresponding controlled current output.

4. The method of claim 2, further comprising: generating the reference current.

5. The method of claim 4, further comprising:
    adjusting the reference current to represent the desired gap between the fixed plate and the electrostatically movable plate.

6. The method of claim 2, wherein selectively mirroring the reference current onto the controlled current output generates the variable voltage compliant controlled current output.

7. The method of claim 1, further comprising selectively setting a predetermined charge in the MEMs device before displacing the electrostatically movable plate in response to the controlled current output.

8. An apparatus for controlling a gap between at least one fixed plate and an electrostatically movable plate in a MEMs device, comprising:
    means for selectively setting a reference current onto a controlled current output that is variable voltage compliant, the controlled current output coupled to the MEMs device on the basis of the time modulated control signal;
    means for time modulating a control signal to represent a desired gap between the fixed plate and the electrostatically movable plate by a charge which is a function of the controlled current output and the modulated time; and
    means for displacing the electrostatically movable plate in response to the controlled current output.

* * * * *